US006449392B1

(12) United States Patent
Divakaran et al.

(10) Patent No.: US 6,449,392 B1
(45) Date of Patent: Sep. 10, 2002

(54) METHODS OF SCENE CHANGE DETECTION AND FADE DETECTION FOR INDEXING OF VIDEO SEQUENCES

(75) Inventors: Ajay Divakaran, Scotch Plains; Huifang Sun, Cranbury; Hiroshi Ito, Fort Lee; Tommy C. Poon, Murray Hill, all of NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/231,698

(22) Filed: Jan. 14, 1999

(51) Int. Cl.[7] .............................. G06K 9/46; H04B 1/66; G06F 3/00
(52) U.S. Cl. .................. 382/235; 382/236; 375/240.25; 345/328
(58) Field of Search ................................ 382/236, 235, 382/232, 239; 348/700, 699; 375/240.25, 240.26; 345/328, 327, 326

(56) References Cited

U.S. PATENT DOCUMENTS 5,911,008 A * 6/1999 Nikura et al. ............... 382/236
5,990,980 A * 11/1999 Golin ......................... 348/700

FOREIGN PATENT DOCUMENTS

| EP | 0587397 A2 | 9/1993 | ............ H04N/7/13 |
| EP | 0675495 A2 | 3/1995 | ............ G11B/27/28 |
| EP | 0810793 A2 | 12/1997 | ............ H04N/7/50 |

OTHER PUBLICATIONS

"Spatially reduced image extraction from MPEG–2 video: fast algorithms and applications, " Song, J. et al., SPIE vol. 3312, 1997, pp. 93–107.*
Divakaran et al., "Scene Change Detection and Feature Extraction for MPEG–4 Sequences"; Proceedings of the 1999 7th Conference of the Storage and Retrieval for Image and Video Databases; Jan. 1999, vol. 3656, pp. 545–551.
Feng et al.; "Scene Change Detection Algorithm for MPEG Video Sequence" Proceedings of the 1996 IEEE International Conference of Image Processing; Sep. 1996, vol. 2, pp. 821–824.
Yeo et al.; "Rapid Scene Analysis on Compressed Video"; IEEE Transactions on Circuits and Systems for Video Technology; vol. 5 No. 6, pp. 533–544.
Yeo et al.; "A Unified Approach to Temporal Segmentation of Motion JPEG and MPEG Compressed Video"; Proceedings of the International Conference on Multimedia Computing and Systems. May, 1995. pp. 81–88.
Won et al.; "Extracting Image Features from MPEG–2 Compressed Stream"; Proceedings from the SPIE; Jan. 1998, pp. 426–435.

* cited by examiner

Primary Examiner—Wenpeng Chen
(74) Attorney, Agent, or Firm—Dirk Brinkman

(57) ABSTRACT

This invention relates to methods of abrupt scene change detection and fade detection for indexing of MPEG-2 and MPEG-4 compressed video sequences. Abrupt scene change and fade-detection techniques applied to signals in compressed form have reasonable accuracy and the advantage of high simplicity since they are based on entropy decoding and do not require computationally expensive inverse Discrete Cosine Transformation (DCT).

21 Claims, 1 Drawing Sheet

Figure 1:
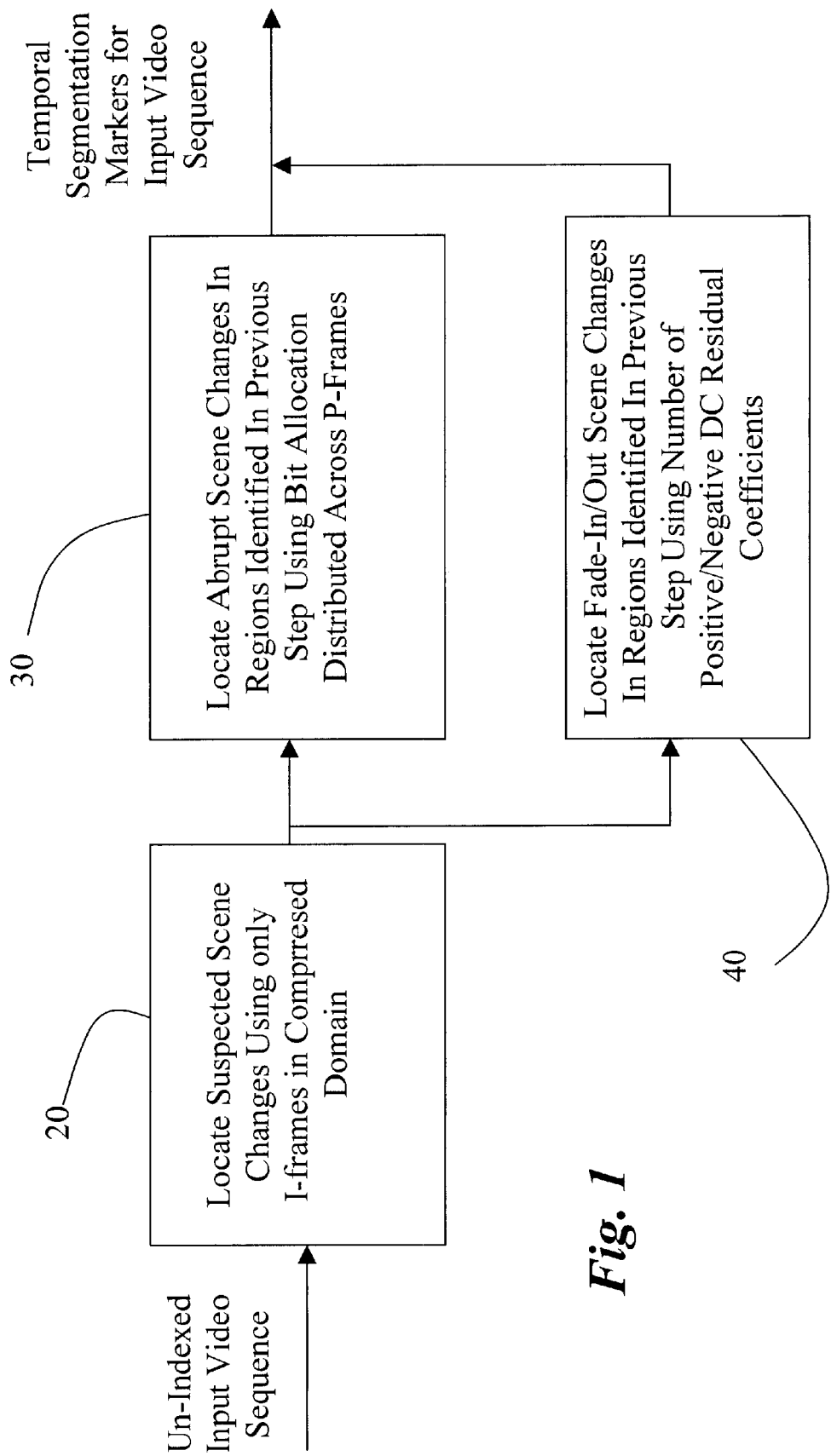

METHODS OF SCENE CHANGE DETECTION AND FADE DETECTION FOR INDEXING OF VIDEO SEQUENCES

BACKGROUND OF THE INVENTION

1. Field of the Invention

This invention relates to methods of scene change detection and fade detection for indexing of video signal sequences of the types encountered in, for example, High Definition Television (HDTV) broadcast signals and other video distribution systems such as are encountered on world wide web video services.

2. Description of the Prior Art

Basic methods for compressing the bandwidth of digital color video signals have been adopted by the Motion Picture Experts Group (MPEG).

The MPEG standards achieve high data compression rates by developing information for a full frame of the image only every so often. The full image frames, or intra-coded pictures are called "I-frames", and contain full frame information independent of any other frames. B-frames and P-frames are encoded between the I-frames and store only image differences with respect to the reference anchor frames.

Typically, each frame of a video sequence is partitioned into smaller blocks of pixel data and each block is subjected to a discrete cosine transformation (DCT) function to convert the statistically dependent spatial domain picture elements (pixels) into independent frequency domain DCT coefficients.

Respective 8×8 blocks of pixels are subjected to the Discrete Cosine Transform (DCT) to provide the coded signal. The resulting coefficients typically are subjected to adaptive quantization, and then are run-length and variable-length encoded. Thus, the blocks of transmitted data typically include fewer than an 8×8 matrix of codewords. Macroblocks of intraframe encoded data (I-frames) will also include information such as the level of quantization employed, a macroblock address or location indicator, and a macroblock type, the latter information being referred to as "header" or "overhead" information.

The blocks of data encoded according to P or B interframe coding also consist of matrices of Discrete Cosine Coefficients. In this instance, however, the coefficients represent residues or differences between a predicted 8×8 pixel matrix and the actual 8×8 pixel matrix. These coefficients also are subjected to quantization and run- and variable-length coding. In the frame sequence, I and P frames are designated anchor frames. Each P frame is predicted from the lastmost occurring anchor frame. Each B frame is predicted from one or both of the anchor frames between which it is disposed. The predictive coding process involves generating displacement vectors, which indicate which block of an anchor frame most closely matches the block of the predicted frame currently being coded. The pixel data of the matched block in the anchor frame is subtracted, on a pixel-by-pixel basis, from the block of the frame being encoded, to develop the residues. The transformed residues and the vectors comprise the coded data for the predictive frames. As with intraframe coded frames, the macroblocks include quantization, address and type information.

The results are usually energy concentrated so that only a few of the coefficients in a block contain the main part of the picture information. The coefficients are quantized in a known manner to effectively limit the dynamic range of ones of the coefficients and the results are then run-length and variable-length encoded for application to a transmission medium.

The so-called MPEG-4 format is described in "MPEG-4 Video Verification Model Version 5.0", distributed by the Adhoc Group on MPEG-4 Video VM Editing to its members under the designation ISO/IEC JTC1/SC29/WG11 MPEG 96/N1469, November 1996. The MPEG-4 video coding format produces a variable bit rate stream at the encoder from frame to frame (as was the case with prior schemes). Since the variable bit rate stream is transmitted over a fixed rate channel, a channel buffer is employed to smooth out the bit stream. In order to prevent the buffer from overflowing or underflowing, rate control of the encoding process is employed.

With the advent of new digital video services, such as video distributed on the world wide web, there is an increasing need for signal processing techniques for identifying scene changes and other characteristics in the video sequences, such as scene-change-like object changes in the MPEG-4 context. Identification of scene changes, whether they are abrupt or gradual, are useful for the purposes of indexing, which, for example, facilitates rapid and simple image retrieval and scene analysis.

In the future, it should be expected that a significant amount of digital video material will be provided in the form of compressed or coded data as described above. Operating on the video sequence information in its compressed form, rather than its decompressed or decoded form, where possible, usually permits more rapid processing because of the reduction in data size and the avoidance of transformation. It is advantageous to develop methods and techniques which permit operating directly on compressed data, rather than having to perform full frame decompression before other processing is performed.

It is known that when a block (macroblock) contains an edge boundary of an object, the energy in that block after transformation, as represented by the DCT coefficients, includes a relatively large DC coefficient (top left corner of matrix) and randomly distributed AC coefficients throughout the matrix. A non-edge block, on the other hand, usually is characterized by a similar large DC coefficient (top left corner) and a few (e.g. two) adjacent AC coefficients which are substantially larger than other coefficients associated with that block. This information relates to image changes in the spatial domain and, when combined with image difference information obtained from comparing successive frames (i.e. temporal differences) factors are available for distinguishing one video object (VO) from another. If only the DC values of macroblocks are used, an image that results will be a blurred version of the original image which retains much of the content of the original.

Thus, previous work in indexing from compressed video had mostly emphasized DC coefficient extraction. In a paper entitled "Rapid Scene Analysis on Compressed Video", IEEE Transactions on Circuits and Systems for Video Technology, Vol. 5, No. 6, December 1995, page 533–544, Yeo and Liu describe an approach to scene change detection in the MPEG-2 compressed video domain, as well as review earlier efforts at detecting scene changes based on sequences of entire (uncompressed) image data, and various compressed video processing techniques of others. Yeo and Liu introduced the use of spatially reduced versions of the original images, so-called DC images, and DC sequences extracted from compressed video to facilitate scene analysis operations. Their DC image is made up of pixels which are the average value of the pixels in a block of the original image and the DC sequence is the combination of the resulting reduced number of pixels of the DC image.

Won et al, in a paper published in Proc. SPIE Conf. on Storage and Retrieval for Image and Video Databases, January 1998, describe a method to extract features from compressed MPEG-2 video by making use of the bits expended on the DC coefficients to locate edges in the frames. However, their work is limited to I-frames only. Kobla et al describe a method in the same Proceedings using the DC image extraction of Yeo et al to form video trails that characterize the video clips. Feng et al (IEEE International Conference on Image Processing, Vol. 11, pp. 821–824, Sept. 16–19, 1996), use the bit allocation across the macroblocks of MPEG-2 frames to detect abrupt scene changes, without extracting DC images. Feng et al's technique is computationally the simplest since it does not require significant computation in addition to that required for parsing the compressed bitstream.

STATEMENT OF THE INVENTION

In accordance with a first aspect of the present invention, computationally simple methods have been devised which employ combinations of certain aspects of Feng et al's approach and Yeo et al's approach to give accurate and simple abrupt and/or gradual scene change detection. The present inventors also have investigated techniques that make use of bit allocation information to extract features and detect gradual scene changes, each of which is described in further detail in concurrently filed applications.

Previous work in gradual scene change detection has employed various techniques such as considering the edge change fractions, a twin comparison approach, block matching based motion compensation-estimation, the detection of plateaus in a delayed frame difference metric, and a video edit model based approach. Of these, only the approach of detecting plateaus operates in the compressed domain.

It should be noted that the DC image extraction based technique is good for I-frames since the extraction of the DC values from I-frames is relatively simple. However, for P-frames, additional computation typically is needed. The present inventors have determined, that, once a suspected scene/object change has been accurately located in a group of consecutive frames/objects by use of a DC image extraction based technique, application of an appropriate bit allocation-based technique, and/or an appropriate DC residual coefficient processing technique to P-frame information in the vicinity of the suspected change information quickly and accurately locates the cut point. This combined method is applicable to either MPEG-2 sequences or MPEG-4 multiple object sequences. In the MPEG-4 case, it has been found to be advantageous to use a weighted sum of the change in each object of the frame, using the area of each object as the weighting factor.

The bits allocated to the DC coefficients of P-frames are also used to detect fade-in and fade-out gradual scene changes.

In accordance with this first aspect of the present invention, a method of processing digital image-representative video data in compressed form comprises the steps of extracting, from a sequence of digital image-representative video data in compressed form, which comprises at least I-frames and P-frames occurring between the I-frames, sub-sequences of frames, each including at least a set of temporally adjacent I-frames. The compressed form data for each sub-sequence is processed to extract corresponding DC image values for each of the I-frames. Corresponding DC image values for temporally adjacent pairs of the I-frames are compared to detect instances of difference information exceeding a first threshold value. Pairs of the I-frames which indicate potential scene changes are identified according to the comparing step. The process further comprises retrieving video data for P-frames occurring only between those I-frames identified from the DC image differences as indicating potential scene changes, and detecting the occurrence of scene changes by at least one of the steps of determining bit allocation distribution differences across the retrieved P-frames to locate the occurrence of abrupt scene changes and by determining numbers of positive and negative DC residual coefficients in the retrieved P-frames in excess of a second threshold value to locate fade in and fade out, respectively.

DRAWING

In the drawing:

FIG. 1 is a schematic block diagram which illustrates certain aspects of the present invention.

DETAILED DESCRIPTION

DESCRIPTION OF THE PREFERRED EMBODIMENT.

Referring to the schematic diagram of FIG. 1 of the drawing, it can be seen that methods according to a first aspect of the present invention make use of a preliminary step which involves locating suspected scene changes using only I-frame information in the compressed domain (block 20 of the diagram). This step relies upon use of DC image-based criteria to "qualify" certain pairs of frames as indicating gradual or abrupt scene changes. Thereafter, the qualified frame associated information is further processed to locate abrupt and/or fade-in, fade-out scene changes using either a bit allocation distribution criterion across P-frames (block 30) or a criterion comparing the number of positive/negative DC residual coefficients (block 40) with respect to each P-frame in the regions where there is a suspected scene or object change.

In this manner, temporal segmentation markers may be generated and are associated with the input video sequence to locate and identify the particular types of scene changes of the video sequence.

Specific preferred arrangements for each of the abrupt scene change and fade-in/fade-out scene change detection steps will now be described in detail. It should be appreciated that there is substantial opportunity for varying details of these steps without departing from the more general aspects of the present invention. Detailed method steps are, however, indicated below to provide an appreciation for the possible variations to persons skilled in this art.

Simply stated, one aspect of the present method comprises the following steps:

1. Locate the GOP's in which scene changes are suspected to exist by using the DC—image-based process on successive I-frames;
2. Apply the bit allocation-based criterion to P-frames in each of the GOP's selected in step 1 to locate cut points.

To apply this latter technique to MPEG-4 compressed video, the following detailed steps are employed.

Since MPEG-4 is object-based, similarly located objects in two adjacent frames are compared. The temporal change in each object is measured in terms of the numbers of bits for encoding and a weighted average of the changes (differences) over all the objects in a frame is determined, with the weight being related to the fraction of the total frame area occupied by the object. Object changes also are detected by repeating the procedure at the object level in each shot or scene. Changes above a threshold level indicate a suspected scene change.

Since the number of bits taken to encode each object varies significantly, a fixed threshold is not suitable as it might be in MPEG-2 data. Using a fixed threshold with MPEG-4 data results in false detection and/or fails to detect scene changes at the object level. A combination of a fixed threshold and a sliding window therefore is used to ensure that the detection works at all bit rates of interest.

It should also be taken into account that frame replication is sometimes used when changing from one frame rate to another. This practice can lead to a false scene change detection where bit allocation techniques are employed as described above. Therefore, as a further refinement, by splitting the bit allocation bit image into two images, one corresponding to the bit allocation for motion vectors and the other corresponding to the residual, frame replication can then be detected as a sudden dip in the number of bits required to encode the motion vectors, as well as an accompanying dip in the number of bits required to encode the residual. This simultaneous dip in both parameters disqualifies this data from the scene change determination. Thus this added refinement eliminates a false detection problem where frame replication is used.

The specific steps employed for abrupt scene change detection are as follows:

1. Let the test sequence S consist of frames $I_0 PP \ldots I_1 PP \ldots I_3 \ldots$
2. Form a sub-sequence $S_1$ consisting of the I-frames $I_0 I_1 \ldots$
3. Carry out scene change detection of $S_1$ using the DC image based criterion. That is, for each macroblock, determine an average DC value equal to ¼ the sum of the DC values for each 8×8 block in the macroblock, compare temporally adjacent corresponding macroblocks to determine the difference for each macroblock. The sum of the absolute values of the differences for all macroblocks in the frame is then calculated and is divided by the sum of the absolute values of the DC values for all macroblocks in the frame to provide a normalized change per macroblock. It is then possible to determine that a potential scene change exists when any frame to frame difference (normalized change per macroblock) is greater than a selected first threshold value. It has been determined empirically that a threshold of 0.25 is a suitable threshold.

In the MPEG-4 case, while comparing frames, compare objects occupying the closest corresponding spaces in the frames, and if the objects being compared are of different sizes, obtain the best match between the two objects to compute the difference criterion by using a motion-estimation-like process. Let the area of each object $O_i$ be $A_i$, its difference criterion be $d_i$ and the difference criterion corresponding to frame n be $D_n$. Then the total criterion will be:

$$D = \frac{\sum A_i * D_n}{\sum_i A_1}$$

4. From the previous step identify pairs $I_m, I_{m+1}$ that have a suspected scene change. Let the corresponding GOP's be $G_{test}[1], G_{test}[2] \ldots$ 5. For each GOP from the previous step carry out scene change detection using:
   (a) P frame to P frame comparison using a bit allocation (bits per macroblock) criterion;
   (b) If no scene change is detected in the previous step, let the GOP previous to the tested GOP be $GOP_{prev}$ and the GOP succeeding the tested GOP be $GOP_{next}$. Then take the last P frame of $GOP_{prev}$ and compare it with the first P-frame of $GOP_{test}$, using the bits per macroblock criterion, and similarly take the last P-frame of the tested GOP and compare it with the first P-frame of $GOP_{next}$. If a scene change is then detected, declare the scene change occurrence at the corresponding I-frame or else declare failure of the bit allocation based algorithm. If the algorithm fails, use the DC image-based algorithm for the next sequence.

6. Segment S into shots based on the above scene change detection.

7. In the MPEG-4 case, repeat the same procedure within each shot to detect abrupt object changes.

It has also been observed that an ambiguity may arise when a scene change is located either at an I-frame or at a P-frame that immediately follows an I-frame. Recall that the definitive scene change processing steps are taken with respect to P-frame information after a suspected scene change has been identified by inspecting I-frame information. Then, if the GOP sequence is taken as $I_1 \ P_1 \ P_2 \ P_3—I_2$ and a spike is detected in the bit rate difference function at the comparison of $P_1$ and $P_2$, according to the prior approach of Feng et al described above, a scene change would be declared between $P_1$ and P2. However, the change actually may have occurred between $I_1$ and $P_1$ or at $P_2$.

If the scene change actually occurred between I1 and $P_1$, the bit allocation of the latter frame will differ sufficiently from that of $P_2$ to imply the occurrence of a scene change at that point, even though the two adjacent P-frames are, in fact, similar in content. In fact, it is the similarity between $P_1$ and $P_2$ which gives rise to the difference in bit allocations in the two. The ambiguity in the timing of the scene change can be resolved by reference to the bits spent on motion vectors in the two adjacent P-frames. That is, the sum total of bits spent on motion vectors is calculated for each frame whenever the ambiguity possibility arises ( i.e. when the bit allocation criterion as described below indicates occurrence of a scene change between a $P_1$ and a $P_2$ frame). A scene change between $I_1$ and $P_1$ will induce a spike in the motion vectors spent on $P_1$. If the scene does not change immediately following such a spike, the number of bits spent on motion vectors in the following frames will display a continuity in magnitude which is not shared by the bits spent on the motion vectors of P1. By comparing the bits spent on motion vectors for $P_1$, to the following frames, the scene change can be defined as occurring between $I_1$ and $P_1$. If the scene change occurred, in fact, at P2, then the anomalous motion vector allocation will be seen at $P_2$. It is a computationally simple process to analyze this motion vector information in the manner described.

The Bit Allocation Based Criterion.

For each object, construct a "bit rate matrix" which consists of the number of bits required to encode each macroblock. Let $R=\{r(i,j)\}$ and $S=\{s(i,j)\}$ be two rate matrices, then the rate difference between R and S is $$d(R, S) = \sum_{i,j} |r(i, j) - s(i, j)|$$

where r(i,j) is the number of bits required by the (i,j)$^{th}$ macroblock of the object in one P-frame and s(i,j) is the number of bits required by the corresponding block in the next P-frame. Given a sequence of rate matrices $R_m$, m=1,2 ... N+1, we can obtain the normalized rate difference sequence $RP_m$, m=1,2, ..., N as $$RP_m = \frac{d(R_m R_{m+1})}{T_m}$$

where $T_m$ is the total number of bits required by the m$^{th}$ object of the sequence $RP_m$. Use a sliding window (i.e. a predetermined number of frames before and after a frame of interest) to process the rate difference sequence $RP_m$ so as to capture local variation. Declare a scene change from $R_i$ to $R_{i+1}$ if 1. The difference $RP_1$ is the maximum within a symmetric sliding window of size 2k−1 frames and
2. The difference $RP_1$ is also n times the second largest maximum in the sliding window. k=3 and n=2 are used in examples that have been tested. The choice of these parameters depends on empirical data as well as frame rate, the frequency of periodic I-frames, and additional factors. Note that the rate difference can be computed only between two I frames/objects or between two P frames/objects. In other words, all the frames in the sequence $R_i$ should all be either I or P frames (objects). Note also that in an MPEG-4 sequence, all the objects need not necessarily be "refreshed" with intra-coding at the same time.

DC Sequence Based Criterion.

In this approach, a sequence of DC images (objects) X−{dc(i,j)} is constructed where dc(i,j) is the DC value of the (ij)$^{th}$ macroblock of the image (object). Extraction of DC values from Intra- coded frames or objects is simple since it only requires entropy decoding as noted above, but extraction of DC values from Predictive or P frames (objects) requires more computation and memory. Thereafter, a difference sequence is constructed as in the previous sequence using one of several possible metrics. The metric ($d_c$(X,Y) is used between two frames X and Y as defined below:

$$d_c(X, Y) = \sum_{i,j} (|x_{i,j} - y_{i,j}|)$$

One can therefore construct a sequence $d_c(X_i, X_{i+1})$ for the sequence and use the previously described sliding window approach to detect scene changes.

Fade Detection Using Changes in Bits Taken to Encode DC Components of Residuals.

It has been observed that, when there is a gradual scene change, every block of the image includes a DC correction term, since the image is fading in from a completely black frame or fading out to a completely black frame. With this in mind, it has been found that bit allocation profiles for DC components of residual blocks provide an indicator for fade detection. In accordance with one aspect of the present invention, a method of fade detection comprises the following steps.

1. Compare the DC images of successive I-frames to locate suspected scene changes. This has been found to be necessary for the method of detecting abrupt scene changes as described above. This step helps save computation, since a search is made thereafter for a scene change only in the signal segments in which successive I-frames differ widely, thus avoiding processing the entire signal sequence.
2. For each P-frame in the regions in which there is a suspected scene change, the number of blocks with negative DC components as well as the number of blocks with positive DC components are counted. For the MPEG-2 as well as the MPEG-4 case, this step would be straightforward from the VLC parsing, since every non-zero DC component will be allocated a non-zero number of bits and a sign bit that indicates whether the component is positive or negative. Zero DC components are indicated by the run-lengths and thus can be readily skipped.
3. Determine the characteristic of the two numbers obtained above versus the frame number, and determine the regions in which suspected scene changes have been located according to step 1 above.
4. Declare a fade-out if the number of negative transitions is consistently greater than or equal to 60% of the total number of non-zero transitions over a period of time (number of frames) corresponding substantially to a normal scene change interval (approximately one second). Conversely, declare a fade-in if the number of positive transitions meets the aforementioned threshold.

This fade detection technique capitalizes on the motion search carried out by the encoder. It measures the rate spent on encoding the DC difference between a particular macroblock and its closest match in the previous frame. As a still further refinement of scene change detection, the possibility of a scene change occurring at a B-frame between two P-frames also may be detected, once it has been determined that the two particular P-frames lie between two I-frames for which a scene change is indicated. By so defining the scene change interval, it will be known that the scene change occurred not later than the last P-frame in that interval. However, the scene change may have occurred at the first P-frame or at a B-frame intermediate the two P-frames. To make the further determination, advantage is taken of the fact that the bits encoded as part of the B-frame information include a FLAG which identifies which of the preceding or succeeding P-frames served as the reference frame for constructing the B-frame in question. The B-frame is constructed using either forward or backward or bidirectional comparisons with adjoining P-frame information. The FLAG will identify the particular comparison employed.

By inspecting the flag, one can determine the following:

1. If the B-frame relied on the proceeding P-frame as a reference, than the minimum difference existed in that direction and the scene change should be identified as occurring at the later P-frame;
2. If the B-frame relied on the following (later) P-frame as a reference, than the minimum difference existed in that direction and the scene change should be identified as occurring at the B-frame;
3. If the B-frame relied on a bidirectional comparison, no scene change occurred between the P-frames and, therefore, the scene change should be identified as occurring at the first (earlier) P-frame.

While the invention has been described in terms of a preferred embodiment, various modifications may be employed without departing from the scope of the invention, which is set forth in the following claims.

What is claimed is:

1. A method of processing digital video data in compressed form, comprising:

processing a sequence of digital video data in compressed form, including at least I-frames and P-frames temporally disposed between the I-frames, to determine corresponding DC image values for each of the I-frames;

detecting instances of differences in the DC image values for pairs of temporally adjacent ones of the I-frames exceeding a first threshold value, to identify a potential scene change between a pair of the I-frames;

determining bit allocation distribution differences for the P-frames temporally disposed between the pair of I-frames; and detecting the occurrence of a scene change by comparing the determined bit allocation distribution differences over a predetermined number of neighboring P-frames temporally disposed between the pair of I-frames with each other to identify a normalized it rate difference for one of the neighboring P-frames which is greater than the normalized bit rate difference associated with any of its neighboring P-frames.

2. The method of claim 1, wherein:

the digital video data in compressed form includes at least a first discrete cosine transform (DCT) coefficient associated with each block of each macroblock of each of the I-frames; and the processing to determine the DC image values for each of the I-frames comprises averaging the first DCT coefficients for each block of each macroblock to form a set of DC image values for each I-frame; and the detecting of instances of differences in the DC image values includes comparing sets of corresponding ones of the DC image values for the pairs of I-frames.

3. The method of claim 1, wherein:

the digital video data in compressed form includes at least a first discrete cosine transform (DCT) coefficient associated with each block of each macroblock of each object in each of the I-frames; and the processing to determine the DC image values for each of the I-frames includes averaging the first DCT coefficients for each block of each macroblock of each object to form a set of DC image values for that object for that I-frame; and the detecting of instances of differences in the DC image values includes comparing sets of the DC image values for corresponding objects in the pairs of I-frames.

4. The method of claim 3, wherein:

the corresponding objects are those objects occupying the closest corresponding space in the pairs of I-frames.

5. The method of claim 3, wherein:

the first threshold value is approximately 0.25.

6. The method of claim 1, wherein:

the determining of bit allocation distribution differences for the P-frames temporally disposed between the pair of I-frames includes:

for each object in each P-frame temporally disposed between the pair of I-frames, constructing a bit rate matrix including the number of bits required to encode each macroblock in its respective frame;

comparing the bit rate matrix for each object in each temporally adjacent pair of the P-frames temporally disposed between the pair of I-frames to determine a rate difference; and normalizing the rate difference for each object in each such pair of P-frames.

7. The method of claim 6, wherein the bit rate difference represents the sum of the absolute values of macroblock by macroblock bit differences.

8. The method of claim 6, wherein the normalizing is performed by dividing by the total number of bits used to encode the object.

9. The method of claim 1, wherein the scene change is an abrupt scene change and the difference fro the one p-frame is greater by a factor substantially equal to 2.

10. The method of claim 1, wherein:

the predetermined number is at least five.

11. The method of claim 1 wherein the detecting of instances of differences in the DC image values includes:

comparing DC values for corresponding ones of macroblocks in the pairs of I-frames to determine differences between the DC image values;

summing absolute values of all such differences for all macroblocks in the pair of I-frames;

dividing the sum of absolute values by the sum of absolute values of the DC values for all the macroblocks to determine an average difference per macroblock; and comparing the average difference to the first threshold value and identifying the potential scene change when the average difference is greater than the first threshold.

12. The method of claim 11 wherein:

the first threshold value is approximately 0.25.

13. The method of claim 1, further comprising:

detecting the scene change by also determining a number of positive and a number of negative DC residual coefficients in the P-frames temporally disposed between the pair of I-frames by:

determining DC residual coefficients, including sign information for each of the P-frames temporally disposed between the pair of I-frames; and determining the number of positive and the number of negative DC residual coefficients in the P-frames temporally disposed between the pair of I-frames in excess of a second threshold value to locate fade-in and fade-out scene changes, respectively.

14. The method of claim 13, wherein the determining of the number of positive and the number of negative DC residual coefficients includes:

counting the number of blocks having positive DC components and the number of blocks having negative DC components in each of the P-frames temporally disposed between the pair of I-frames;

determining which count is grater and the sign of the greater for each such P-frame;

determining which count is greater and the sign of the greater for each such P-frame;

identifying each P-frame where the greater count is equal components in such frame;

identifying each group of pictures in which DC components of a particular sign consistently exceed those of opposite sign;

designating a fade-in scene change where the greater count in each such identified group of pictures is associated with a positive sign; and designating a fade-out scene change where the greater count in each such identified group of pictures is associated with a negative sign.

15. The method of claim 14 wherein:

the identifying of each P-frame further comprises identifying each P-frame where the greater count is equal to or more than 60 percent of the non-zero DC components in such frame.

16. A method of processing digital video data in compressed form, comprising:

processing a sequence of digital video data in compressed form, including at least I-frames and P-frames temporally disposed between the I-frames, to determine corresponding DC image values for each of the I-frames; and detecting instances of differences in the DC image values for pairs of temporally adjacent ones of the I-frames exceeding a threshold value, by comparing sets of the DC image values for corresponding objects in the pairs of I-frames, to identify a potential scene change between a pair of the I-frames;

wherein the corresponding objects in temporally adjacent I-frames have different areas, and wherein the comparing of sets of DC image values for corresponding objects in the pairs of I-frames includes summation of the differences in the DC image values for each of the objects weighted by its respective area.

17. A method of processing digital video data in compressed form, comprising:

processing a sequence of digital video data in compressed form, including at least I-frames and P-frames temporally disposed between the I-frames, each macroblock of each P-frame including motion vector bits and residue bits, to determine corresponding DC image values for each of the I-frames;

detecting instances of differences in the DC image values for pairs of temporally adjacent ones of the I-frames exceeding a first threshold value, to identify a potential scene change between a pair of the I-frames;

determining first bit allocation distribution differences for the P-frames temporally disposed between the pair of I-frames in excess of a second threshold value; and detecting the occurrence of the scene change by comparing data corresponding to the motion vector bits of the macroblocks for the P-frames temporally disposed between the pair of I-frames which have a first bit allocation distribution difference in excess of the second threshold value, to determine second bit allocation distribution differences, and comparing data corresponding to the residue bits of the macroblocks for the P-frames temporally disposed between the pair of I-frames which have the first bit allocation distribution difference in excess of the second threshold value, to determine third bit allocation distribution differences.

18. The method of claim 17, wherein the detecting the occurrence of scene changes by determining bit allocation distribution differences further includes observing the second bit rate allocation differences and third bit rate allocation differences to determine occurrence of a false scene change associated with frame replication.

19. The method of claim 18, wherein the observing includes detecting a simultaneous decrease in the number of both motion vector bits and residue bits between temporally adjacent P-frames which have the first bits allocation distribution difference in excess of the second threshold value.

20. The method of claim 17, wherein the detecting the occurrence of scene changes by determining bit allocation distribution differences further includes observing the second bit rate allocation differences to resolve an ambiguity in the time of occurrence of a scene change in a temporal sequence including an I-frame followed by two P-frames.

21. The method of claim 20, wherein the observing includes detecting an increase in the number of motion vector bits between two of the frames in the sequence.

* * * * *